(12) United States Patent
Kuroba et al.

(10) Patent No.: US 12,263,779 B2
(45) Date of Patent: Apr. 1, 2025

(54) VEHICLE, CONTROL METHOD FOR VEHICLE, AND STORAGE MEDIUM

(71) Applicant: HONDA MOTOR CO., LTD., Tokyo (JP)

(72) Inventors: Yoshiyuki Kuroba, Tokyo (JP); Kazuki Akami, Tokyo (JP); Hiroshi Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/585,664

(22) Filed: Feb. 23, 2024

(65) Prior Publication Data

US 2024/0246476 A1  Jul. 25, 2024

Related U.S. Application Data

(63) Continuation of application No. PCT/JP2022/031866, filed on Aug. 24, 2022.

(30) Foreign Application Priority Data

Sep. 2, 2021 (JP) .................................. 2021-143381

(51) Int. Cl.
*B60Q 1/08* (2006.01)
*B60Q 1/34* (2006.01)
*B62J 6/022* (2020.01)

(52) U.S. Cl.
CPC .............. *B60Q 1/08* (2013.01); *B60Q 1/346* (2013.01); *B62J 6/022* (2020.02)

(58) Field of Classification Search
CPC ............ B62J 6/022; B60Q 1/08; B60Q 1/346
See application file for complete search history.

(56) References Cited

U.S. PATENT DOCUMENTS

| | | | | |
|---|---|---|---|---|
| 6,481,876 B2 * | 11/2002 | Hayami | ................... | B60Q 1/18 362/465 |
| 8,562,192 B2 * | 10/2013 | Tatara | ..................... | B60Q 1/08 362/512 |
| 10,279,729 B2 * | 5/2019 | Futamura | ................. | B60Q 1/16 |
| 11,027,790 B2 * | 6/2021 | Horn | ..................... | F21V 23/008 |
| 2009/0041300 A1 * | 2/2009 | Mack | ..................... | B60Q 1/085 382/103 |
| 2020/0331552 A1 | 10/2020 | Horn | | |
| 2024/0181958 A1 * | 6/2024 | Jun | ........................ | G06V 20/58 |

FOREIGN PATENT DOCUMENTS

| | | |
|---|---|---|
| JP | 58-54338 U | 4/1983 |
| JP | 2002-193028 A | 7/2002 |
| JP | 2009-190491 A | 8/2009 |
| JP | 2013-249064 A | 12/2013 |

OTHER PUBLICATIONS

International Search Report dated Nov. 1, 2022, issued in counterpart International Application No. PCT/JP2022/031866, with English Translation. (5 pages).

* cited by examiner

*Primary Examiner* — Arman B Fallahkhair
(74) *Attorney, Agent, or Firm* — WHDA, LLP (57) ABSTRACT

A vehicle including a lamp body that irradiates surroundings of the vehicle, comprising a control unit configured to control an irradiation range of the lamp body according to a speed of the vehicle, wherein the control unit controls the irradiation range according to the speed to be different when the speed increases and when the speed decreases.

18 Claims, 8 Drawing Sheets

VEHICLE, CONTROL METHOD FOR VEHICLE, AND STORAGE MEDIUM

CROSS-REFERENCE TO RELATED APPLICATION(S)

This application is a continuation of International Patent Application No. PCT/JP2022/031866 filed on Aug. 24, 2022, which claims priority to and the benefit of Japanese Patent Application No. 2021-143381 filed on Sep. 2, 2021, the entire disclosures of which are incorporated herein by reference.

TECHNICAL FIELD

The present invention relates to a vehicle, a control method for a vehicle, and a storage medium.

BACKGROUND ART

Patent Literature 1 discloses that an axis of an auxiliary lamp unit is tiltable up and down according to a throttle opening degree, and thus a relatively close position is irradiated at a low speed and a relatively far position is irradiated at a high speed.

CITATION LIST

Patent Literature

PTL1: Japanese Utility Model Laid-open No. 58-054338

SUMMARY OF INVENTION

Technical Problem

However, in the technique described in Patent Literature 1, the throttle opening degree and the irradiation position correspond to each other on a one-to-one basis at both the time of acceleration and the time of deceleration, and it is difficult to adjust an irradiation range to a desired range. That is, it is necessary to control the irradiation range of a lamp body to a more appropriate range according to a speed of a vehicle.

The present invention provides a technique for controlling an irradiation range of a lamp body to a more appropriate range according to a speed of a vehicle.

Solution to Problem

According to one aspect of the present invention, there is provided a vehicle including a lamp body that irradiates surroundings of the vehicle, comprising a control unit configured to control an irradiation range of the lamp body according to a speed of the vehicle, wherein the control unit controls the irradiation range according to the speed to be different when the speed increases and when the speed decreases.

Advantageous Effects of Invention

According to the present invention, it is possible to control the irradiation range of the lamp body to a more appropriate range according to the speed of the vehicle.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Vehicle Configuration

Figure 1:
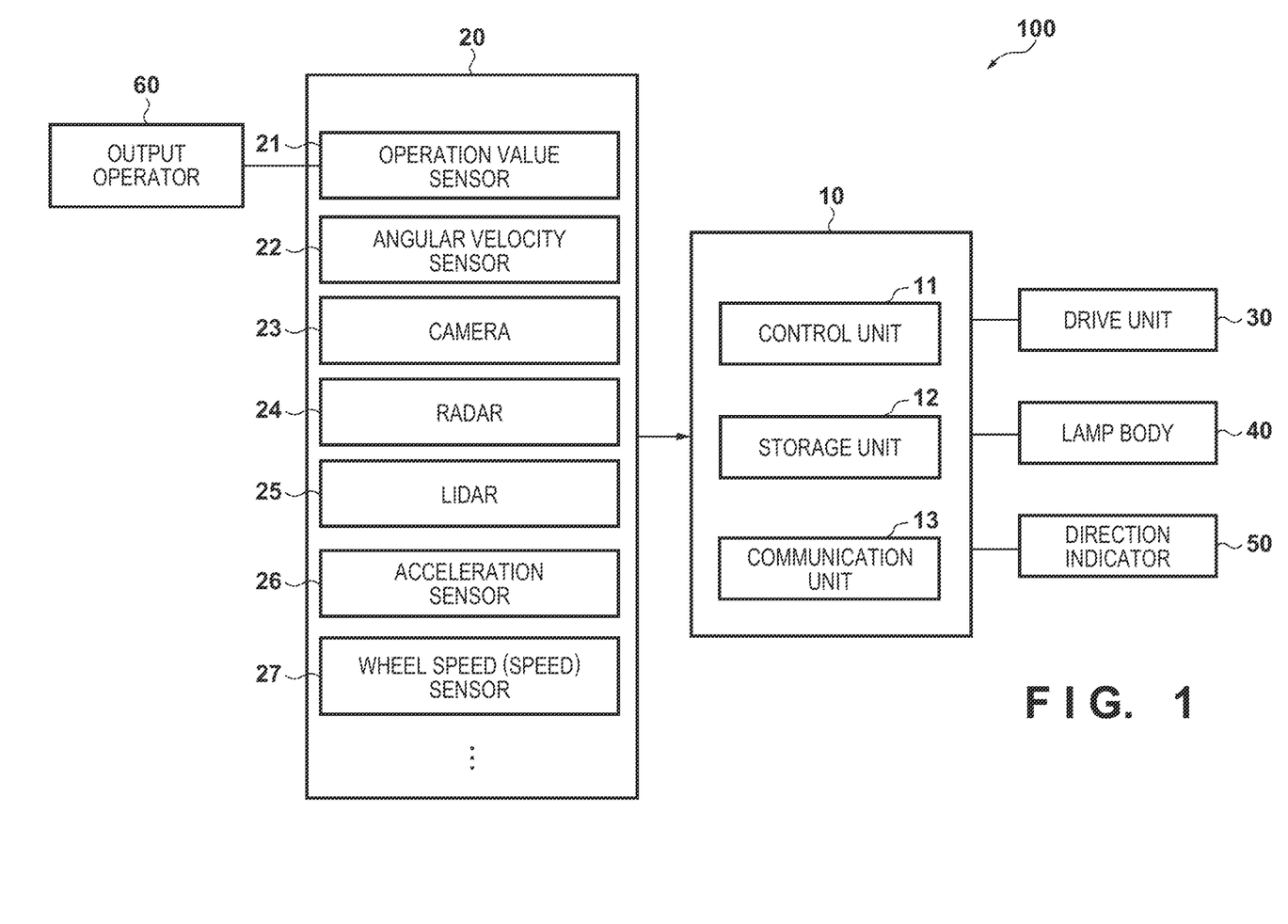
FIG. 1 is a diagram illustrating a configuration example of a vehicle according to an embodiment.

FIG. 1 is a block diagram of a vehicle to which the present invention is applicable. A vehicle 100 includes a control device 10, various sensors 20, a drive unit 30, a lamp body 40, a direction indicator 50, and an output operator 60.

The control device 10 includes a control unit 11 that is a central processing unit (CPU), an electronic control unit (ECU), or the like, a storage unit 12 that is one or more memories (storage media) such as a RAM and a ROM, and a communication unit 13. The control unit 11 executes processing according to the present embodiment by reading and executing one or more programs stored in the storage unit 12. The communication unit 13 can receive information from the various sensors 20, and can transmit and receive information to and from the drive unit 30, the lamp body 40, the direction indicator 50, and the output operator 60.

The various sensors 20 include an operation value sensor 21, an angular velocity sensor 22, a camera 23, a radar 24 and/or a light detection and ranging (LiDAR) 25, an acceleration sensor 26, a wheel speed (speed) sensor 27, and the like.

The operation value sensor 21 detects an operation value of the output operator 60. The angular velocity sensor 22 is a sensor that detects the inclination of the vehicle 100. The camera 23 is an imaging device using, for example, a CCD/CMOS image sensor. The radar 24 is, for example, a ranging device such as a millimeter wave radar. Furthermore, the light detection and ranging (LiDAR) 25 is a ranging device such as a laser radar. These are disposed at positions where peripheral information of the vehicle 100 can be detected, for example, on the front side, the rear side, the upper side, and/or the side of the vehicle. The acceleration sensor 26 detects the acceleration of the vehicle 100. The wheel speed (speed) sensor 27 detects the rotation speed of the wheels of the vehicle 100.

The drive unit 30 is an engine or an electric motor for driving the vehicle 10. The lamp body 40 is an irradiation unit that irradiates the surroundings of the vehicle 100, and can be configured by, for example, one or more LEDs. An irradiation range (irradiation distance or irradiation width) can be changed by changing an irradiation light amount or an irradiation optical axis of the irradiation unit or changing the number of LEDs to be turned on.

The direction indicator 50 is, for example, a blinker, and is a direction indicator for notifying the surroundings of a change in a traveling direction of the vehicle 100. A change in the traveling direction of the vehicle 100 can be detected based on the driving of the direction indicators 50. The output operator 60 is, for example, a throttle, and changes an output of the drive unit 30 according to the operation of the driver of the vehicle 100. The control unit 11 according to the present embodiment controls the irradiation range of the lamp body 40 according to the operation value of the output operator 60 detected by the operation value sensor 21. Note that, in the present embodiment, as an example of controlling the irradiation range of the lamp body 40 when the speed of the vehicle 100 increases and decreases, an example of using the operation value of the output operator 60 detected by the operation value sensor 21 will be described. That is, it is possible to use a throttle opening degree at which it is easy to immediately determine the intention of the driver as an index of the speed of the vehicle or a change in the speed. However, the present invention is not limited thereto. Information on the speed of the vehicle 100 may be acquired from values of the acceleration sensor 26, the wheel speed (speed) sensor 27, and the like, and the information on the speed may be used.

Note that, in the present embodiment, the vehicle 100 is a straddle type vehicle (for example, a two-wheeled vehicle), but the number of wheels is not limited to two.

Irradiation Range (Irradiation Distance)

Figure 2A:
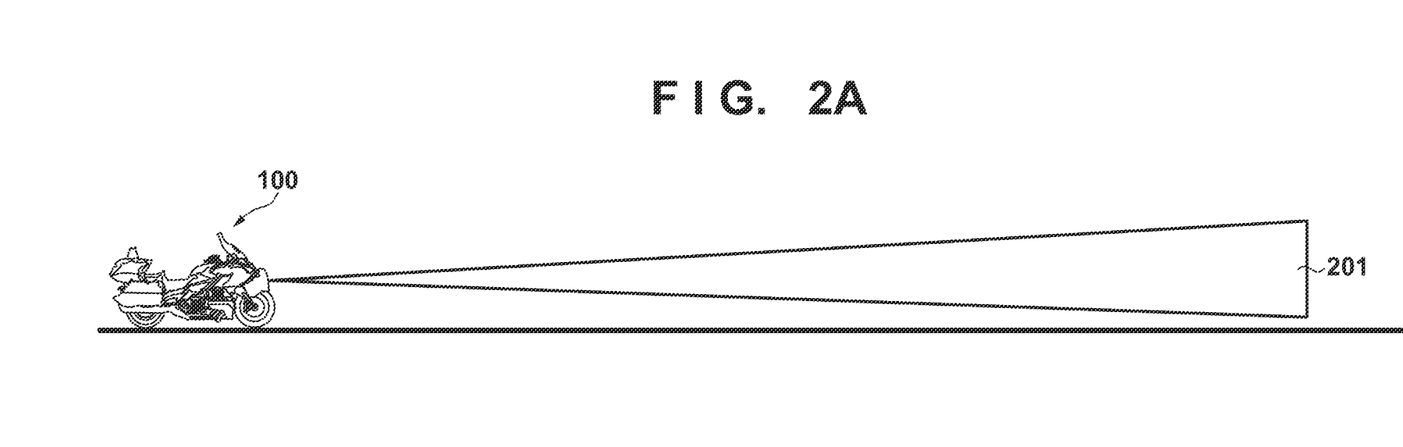
FIG. 2A is a diagram illustrating an example of an irradiation range of a lamp body according to an embodiment at the time of high beam.
Figure 2B:
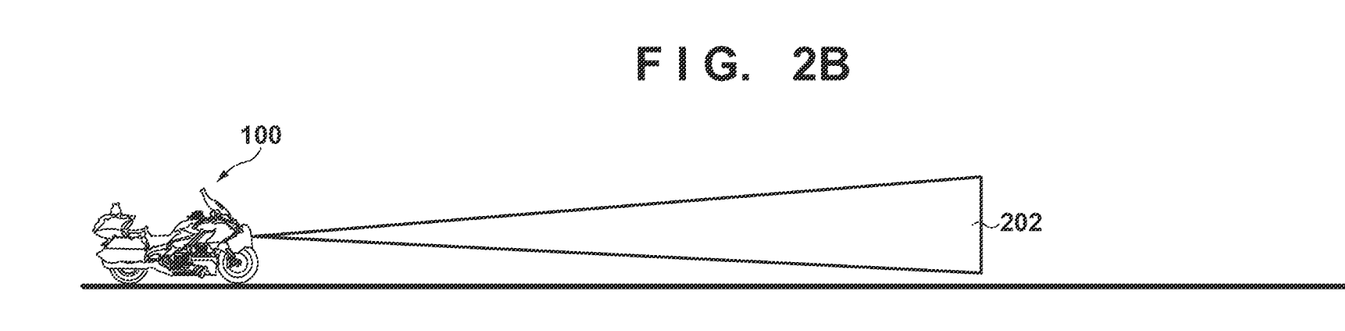
FIG. 2B is a diagram illustrating an example of an intermediate irradiation range of the lamp body according to the embodiment.
Figure 2C:
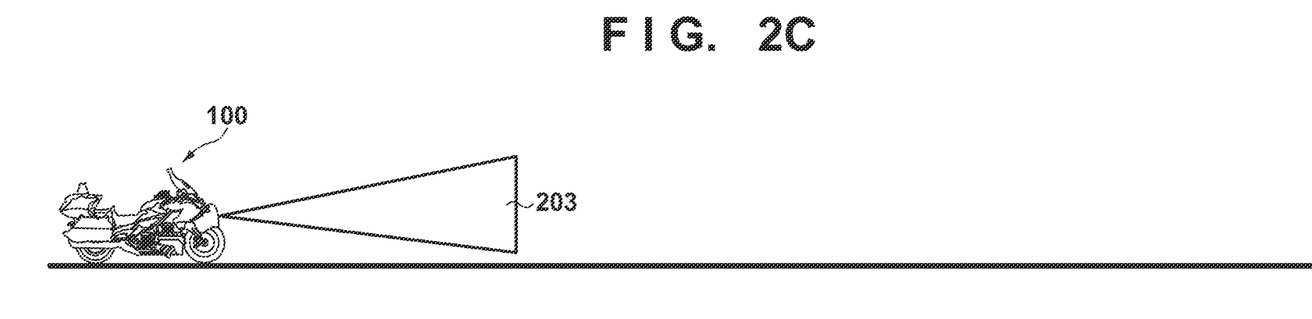
FIG. 2C is a diagram illustrating an example of an irradiation range of the lamp body according to the embodiment at the time of low beam.

Next, an irradiation range of the lamp body 40 according to the present embodiment will be described with reference to FIGS. 2A to 2C. FIG. 2A illustrates an example of an irradiation range (irradiation distance) in a high beam state, and FIG. 2C illustrates an example of an irradiation range (irradiation distance) in a low beam state. FIG. 2B illustrates an example of an irradiation range (irradiation distance) between the high beam and the low beam, and the irradiation range can be adjusted to an arbitrary distance between the high beam and the low beam on the basis of the control of the control unit 11.

Processing

Figure 3:
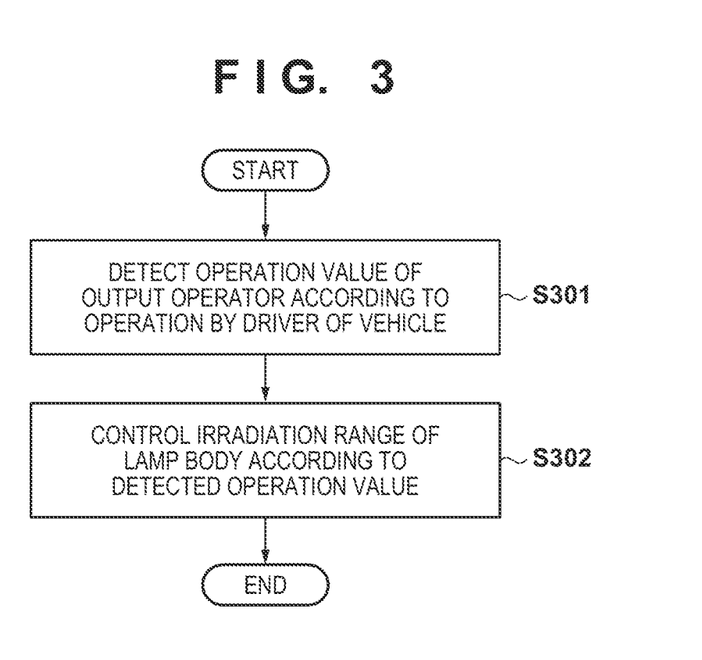
FIG. 3 is a flowchart illustrating a procedure of processing performed by a vehicle according to a first embodiment.

Next, a procedure of processing performed by the vehicle 100 according to the present embodiment will be described with reference to a flowchart of FIG. 3. In S301, the operation value sensor 21 detects an operation value of the output operator 60 which accords to an operation by the driver of the vehicle 100. The operation value is a throttle opening degree of the output operator 60 in the present embodiment, and is a value between 0% and 100%. In S302, the control unit 11 controls the irradiation range (for example, the irradiation distance) of the lamp body 40 according to the operation value detected in S301.

Figure 4:
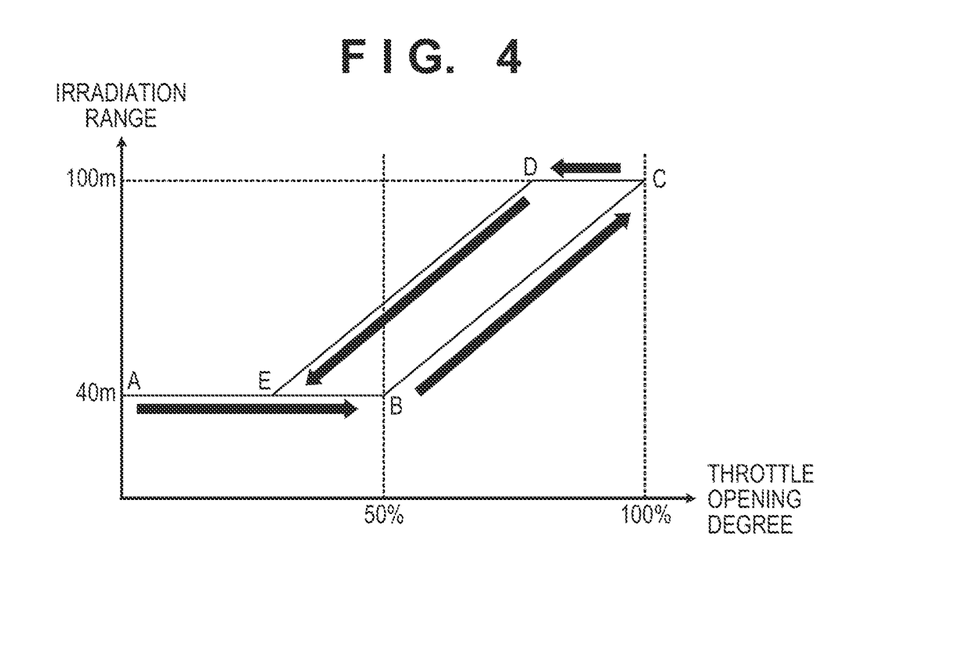
FIG. 4 is an explanatory diagram of a control example according to the first embodiment.

Here, an example of detailed control in S302 will be described with reference to FIG. 4. In FIG. 4, the horizontal axis represents the throttle opening degree, and the vertical axis represents the irradiation range (irradiation distance) of the lamp body 40. The irradiation range (irradiation distance) can be adjusted to a distance of 100 m or less corresponding to the high beam and 40 m or more corresponding to the low beam. First, the operation value increases from 0% in response to an operation of the output operator 60 by an occupant of the vehicle 100 from a stopped state (A to B). During this time, the irradiation range (irradiation distance) is kept constant at a low beam (40 m).

Then, in response to the throttle opening degree having reached a threshold (for example, 50%), the irradiation range becomes wider (the irradiation distance becomes longer) as the throttle opening degree increases thereafter (B to C). Thereafter, when the throttle opening degree decreases, unlike when the throttle opening increases, the throttle opening degree does not change from C to B, but first changes from C to D. That is, when the throttle opening degree decreases, the irradiation range is not immediately narrowed (the irradiation distance is shortened), but a state in which the irradiation range is wide (a state in which the irradiation distance is long) is maintained for a certain period of time. Thereafter, the irradiation range is controlled to be narrowed as the throttle opening degree decreases from D to E.

Figure 5:
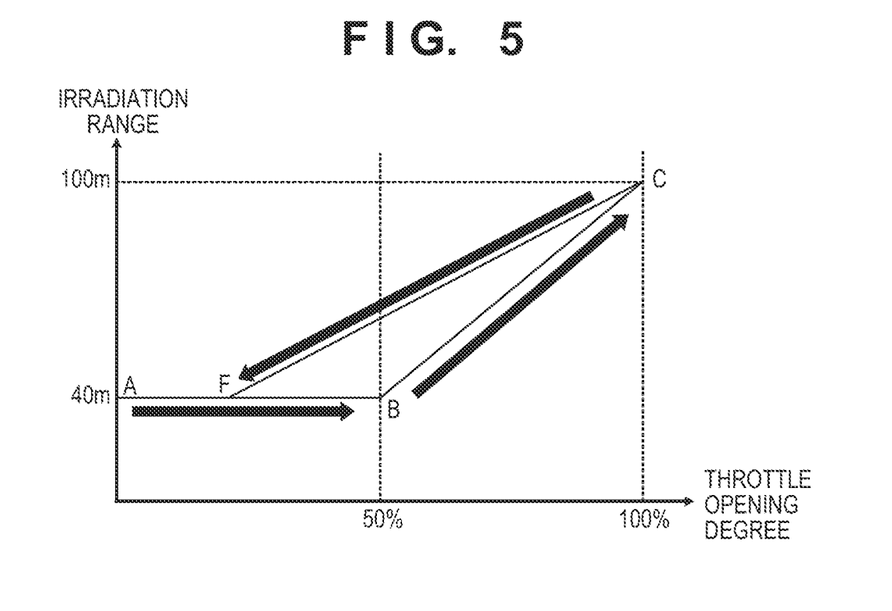
FIG. 5 is an explanatory diagram of another control example according to the first embodiment.

In FIG. 4, the example in which the irradiation range is changed along the line from C to D and from D to E at the time of decreasing the operation value has been described, but the present invention is not limited to the example of FIG. 4. A modification of the detailed control in S302 will be described with reference to FIG. 5. In the example of FIG. 5, when the operation value increases, the irradiation range proceeds from A to B and from B to C as in FIG. 4, but when the operation value decreases, the irradiation range is changed along a line from C to F (so that a gradient when the operation value decreases is gentler than a gradient when the operation value increases). That is, at the time of decreasing the operation value, the irradiation range is narrowed according to the decrease of the operation value, but the speed of narrowing is controlled to be slower than the speed of expanding the irradiation range according to the increase of the operation value at the time of increasing the operation value. In particular, in the example of FIG. 5, a change rate of the irradiation range is controlled to be different between when the operation value increases and when the operation value decreases (controlled to have different gradients).

As illustrated in FIGS. 4 and 5, the control unit 11 performs control to widen the irradiation range when the operation value (throttle opening degree) increases, and performs control to narrow the irradiation range when the operation value decreases. At that time, the irradiation range according to the operation value is controlled to be different between when the operation value is increased and when the operation value is decreased. More specifically, the irradiation range corresponding to an arbitrary operation value is controlled to be wider at the time of decrease than at the time of increase in the operation value (In the case of the same throttle opening degree, a line from C to D, a line from D to E, or a line from C to F is located above a line from B to C.).

As described above, in the present embodiment, the irradiation range of the lamp body is controlled according to the operation value (throttle opening degree) of the output operator, and the irradiation range according to the operation value is controlled to be different between when the operation value increases and when the operation value decreases.

This makes it possible to control the irradiation range of the lamp body to a more appropriate range according to the operation of the driver.

Second Embodiment

In the first embodiment, an example in which the irradiation range of the lamp body is controlled according to the speed of the vehicle, and the irradiation range according to the speed is controlled to be different between when the speed increases and when the speed decreases, specifically, an example in which the irradiation range of the lamp body is controlled according to the operation value (throttle opening degree) of the output operator, and the irradiation range according to the operation value is controlled to be different between when the operation value increases and when the operation value decreases has been described. On the other hand, in the present embodiment, an example of controlling the irradiation range of the lamp body on the basis of a time change rate of the speed of the vehicle will be described. Specifically, an example of controlling the irradiation range of the lamp body on the basis of the time change rate of the operation value will be described. Since a device configuration is similar to the configuration described in the first embodiment, a detailed description thereof will be omitted.

Figure 6:
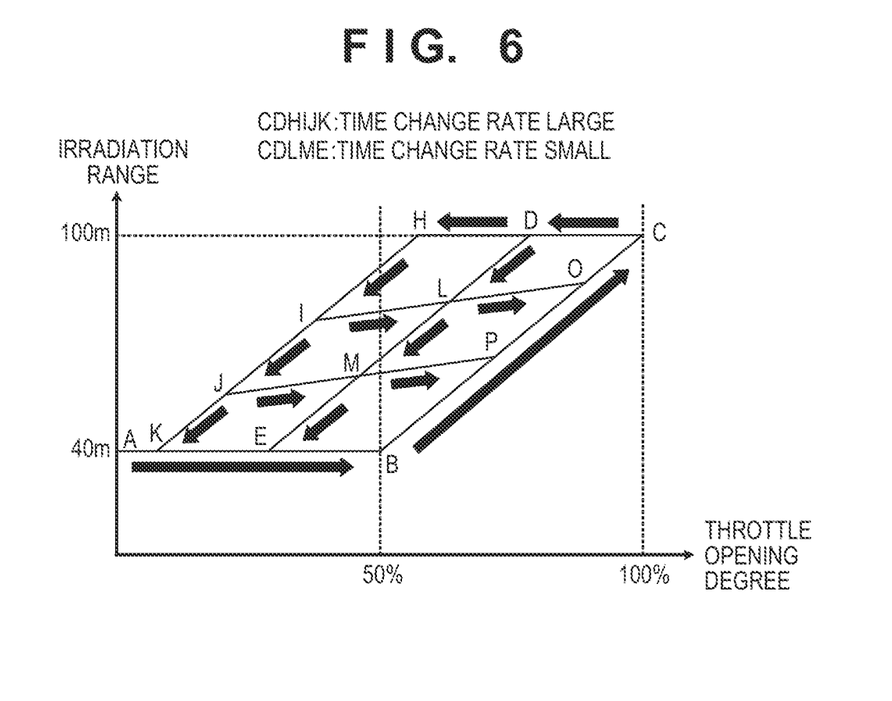
FIG. 6 is an explanatory diagram of a control example according to a second embodiment.

An example of control according to the present embodiment will be described with reference to FIG. 6. In the example of FIG. 6, as in FIG. 4, when the operation value increases, the irradiation range (irradiation distance) is controlled according to the operation value along a line from A to B and then from B to C. On the other hand, when the operation value decreases, the time change rate of the operation value is focused, and when the time change of the operation value is large, it is desired that the irradiation range is not suddenly narrowed (the irradiation distance is not suddenly shortened).

Therefore, in a case where the time change of the operation value is large, the irradiation range (irradiation distance) is controlled according to the decrease of the operation value, for example, along a line going from C→D→H→I→J →K.

On the other hand, when the time change of the operation value is small, for example, the irradiation range (irradiation distance) is controlled along a line going from C→D→L→M→E as in FIG. 4 according to the decrease of the operation value.

Furthermore, although not illustrated, when the time change of the operation value is medium, the irradiation range (irradiation distance) may be controlled according to the decrease of the operation value so as to be along a line having the same gradient as a straight line DE from an arbitrary point between D and H.

As described above, when the operation value decreases, the control unit 11 according to the present embodiment controls the irradiation range corresponding to an arbitrary operation value to be wider as the time change rate of the operation value is larger (For example, a line DH and a line HK are located above the straight line DE.). As a result, it is possible to prevent the irradiation range from changing suddenly due to a sudden change in the operation value, and it is possible to realize control that reduces the discomfort of the driver.

Note that here, the example in which the time change rate of the operation value at the time of decreasing the operation value is large, medium, or small has been described, but the time change rate may be continuously controlled according to the value of the time change rate of the operation value. For example, between the straight line HK and the straight line DE, the irradiation range (irradiation distance) may be controlled according to the decrease in the operation value so as to be along a straight line having the same gradient as the straight line HK or the straight line DE from a position closer to H on the straight line DH as the value is larger (from a position closer to D on the straight line DH as the value is smaller) according to the value of the time change rate of the operation value.

Furthermore, a control example in a case where the operation value is increased again after the operation value is decreased will also be described with reference to FIG. 6. For example, it is assumed that the driver of the vehicle 100 operates the output operator 60 to increase the operation value again at the timing of proceeding C→D→H→I. In this case, for example, the irradiation range is controlled to be widened along a line of I→L→O according to the increase in the operation value. A gradient at this time is set to a value gentler than a gradient of BC. Thereafter, the irradiation range is controlled to be widened along a line of O→C.

Similarly, it is assumed that the driver of the vehicle 100 operates the output operator 60 to increase the operation value again at the timing of proceeding to C→D→H→I→J. In this case, for example, the irradiation range is controlled to be widened along a line of J→M→P according to the increase in the operation value. A gradient at this time is a value gentler than the gradient of BC, and may be the same gradient as the straight line ILO. Thereafter, the irradiation range is controlled to be widened along a line of P→O →C.

Moreover, for example, it is assumed that the driver of the vehicle 100 operates the output operator 60 to increase the operation value again at the timing of proceeding to C→D→L→M. In this case, for example, the irradiation range is controlled to be widened along a line of M→P according to the increase in the operation value. Thereafter, the irradiation range is controlled to be widened along the line of P→O→C.

Similarly, it is assumed that the driver of the vehicle 100 operates the output operator 60 to increase the operation value again at the timing of proceeding from C→D→L. In this case, for example, the irradiation range is controlled to be widened along a line of L→O according to the increase in the operation value. Thereafter, the irradiation range is controlled to be widened along the line of O→C.

As described above, in a case where the driver of the vehicle 100 operates the output operator 60 to increase the operation value again after the operation value decreases, it is possible to prevent the irradiation range from changing abruptly and to implement control that reduces the discomfort felt by the driver.

Third Embodiment

In the present embodiment, an example of controlling the irradiation range (for example, an irradiation width) of the lamp body based on a change in the traveling direction of the vehicle will be described. Since a device configuration is similar to the configuration described in the first embodiment, a detailed description thereof will be omitted.

Processing

Figure 7:
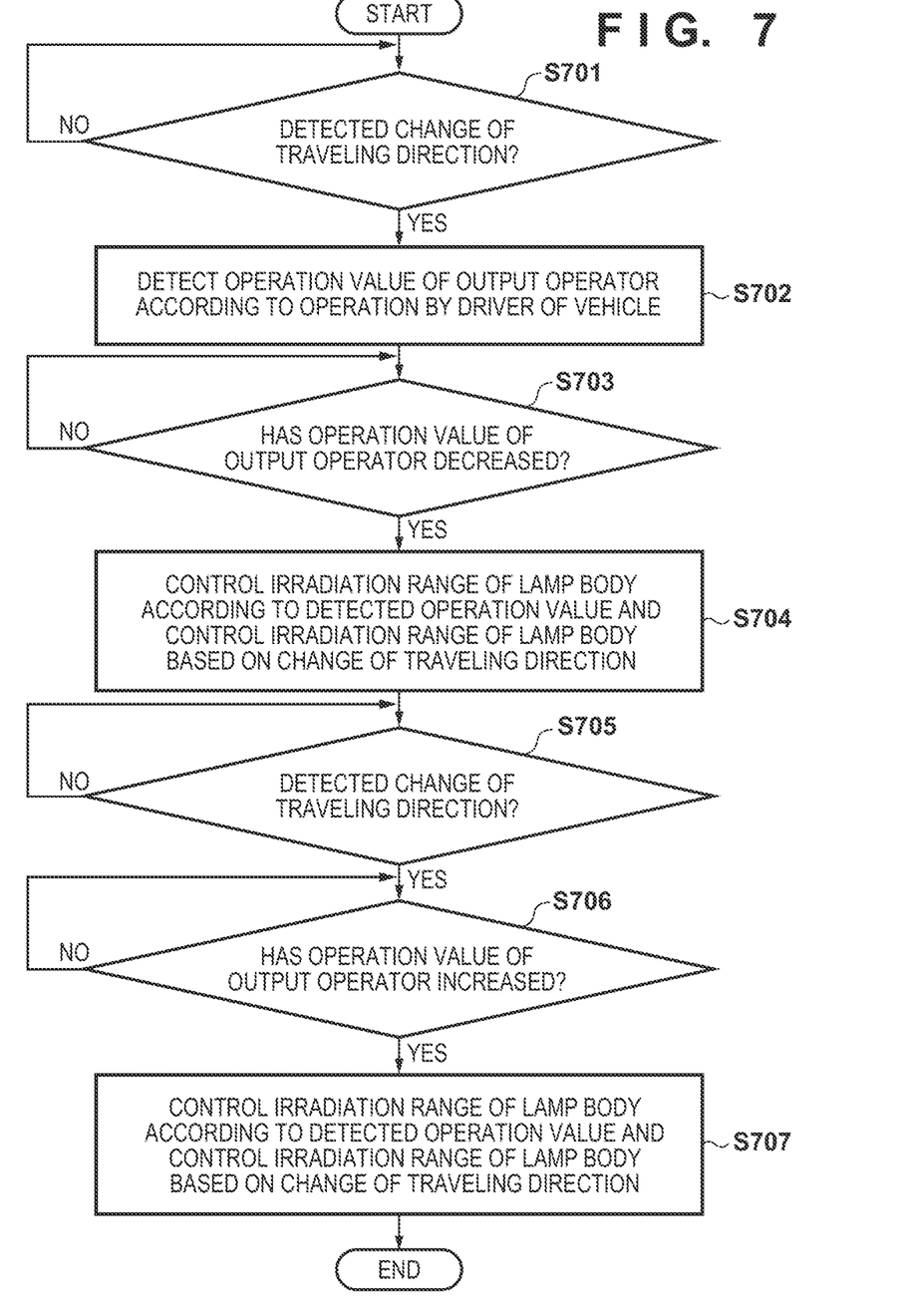
FIG. 7 is a flowchart illustrating a procedure of processing performed by a vehicle according to a third embodiment.

A procedure of processing performed by the vehicle 100 according to the present embodiment will be described with reference to a flowchart of FIG. 7.

In S701, the control unit 11 determines whether or not the traveling direction of the vehicle 100 has changed by detecting the inclination of the vehicle 100 by the angular velocity sensor 22. As a result, it is possible to detect a change in the traveling direction caused by, for example, curve traveling or turning left or right at an intersection. For example, in a case where a predetermined or more inclination is detected, it may be determined that the traveling direction has changed. In a case where the change in the traveling direction is detected, the process proceeds to S702. On the other hand, in a case where a change in the traveling direction is not detected, the process stands by.

In S702, the operation value sensor 21 detects an operation value of the output operator 60 by the driver of the vehicle 100. The operation value is a throttle opening degree of the output operator 60 in the present embodiment, and is a value between 0% and 100%. In S703, the control unit 11 determines whether or not the operation value of the output operator 60 has decreased. In a case where the operation value has decreased, the process proceeds to S704. On the other hand, in a case where it has not decreased, the process stands by.

In S704, the control unit 11 controls the irradiation range (irradiation distance) of the lamp body 40 according to the detected operation value, and controls the irradiation range (irradiation width) of the lamp body 40 based on the change in the traveling direction. The control of the irradiation range (irradiation distance) according to the detected operation value can be the control described in the first embodiment or the second embodiment. In the present embodiment, control of the irradiation range (irradiation width) mainly based on a change in the traveling direction (increase in inclination of the vehicle 100) will be described with reference to FIGS. 8A and 8B.

Figure 8A:
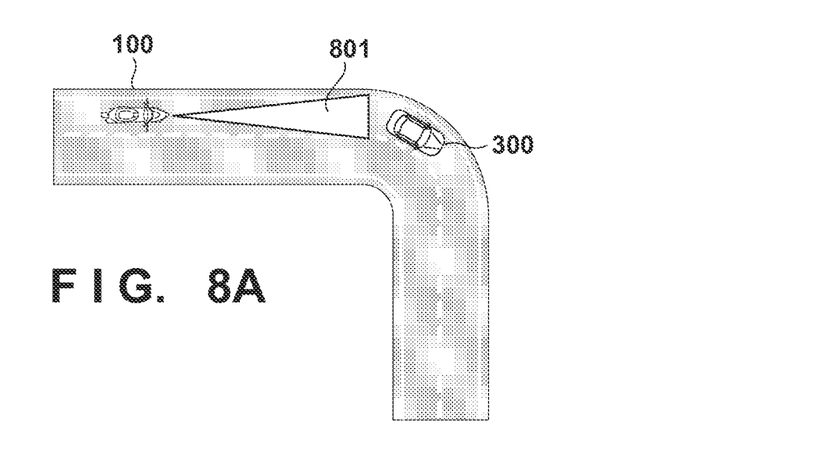
FIG. 8A is a diagram illustrating an example of an irradiation width and an irradiation distance before curve traveling according to the third embodiment.
Figure 8B:
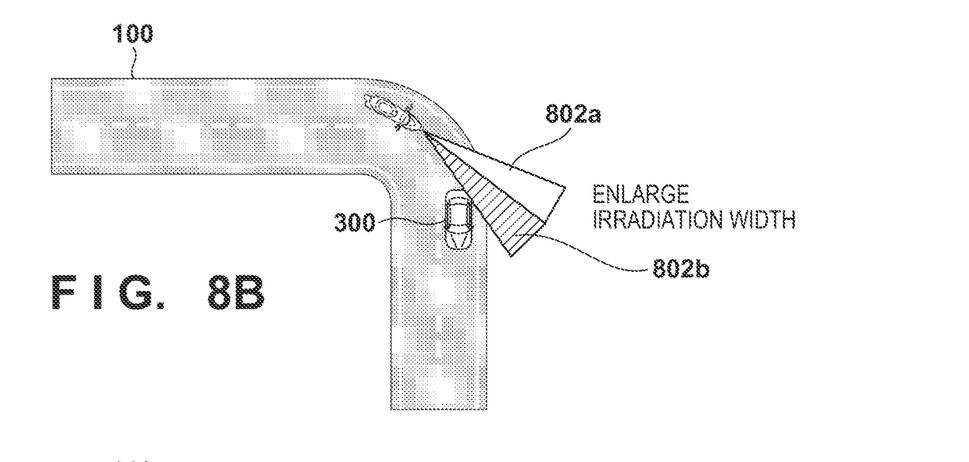
FIG. 8B is a diagram illustrating an example of an irradiation width and an irradiation distance at the start of curve traveling according to the third embodiment.

FIG. 8A illustrates a state before the vehicle 100 according to the present embodiment travels on a road and reaches a curve. A preceding vehicle 300 is traveling, and an irradiation range 801 of the lamp body 40 of the vehicle 100 is illustrated. FIG. 8B illustrates a state in which the vehicle 100 according to the present embodiment approaches the curve and the traveling direction changes to the right. At this time, the operation value of the output operator 60 decreases. The irradiation range (irradiation distance) of the lamp body 40 at this time is an irradiation distance 802 shorter than the irradiation distance 801 according to the decreased operation value. As for the irradiation distance 802, in addition to a normal irradiation range 802a, an irradiation range 802b is enlarged in the right direction which is a side of the traveling direction. In this manner, control is performed to widen the irradiation width by the irradiation range 802a and the irradiation range 802b. As a result, the irradiation range is expanded in the direction in which the road extends and in the direction in which the preceding vehicle 300 is present, so that forward visibility can be improved.

In S705, the control unit 11 determines whether or not the traveling direction of the vehicle 100 has changed by detecting the inclination of the vehicle 100 by the angular velocity sensor 22. As a result, it is possible to detect a change in the traveling direction caused by, for example, curve traveling or turning left or right at an intersection. For example, in a case where a predetermined or more inclination is no longer detected (in a case where the vehicle 100 is about to end turning a curve and the inclination of the vehicle is eliminated to approach an upright state), it may be determined that the traveling direction has changed. In a case where the change in the traveling direction has been detected, the process proceeds to S706. On the other hand, in a case where a change in the traveling direction is not detected, the process stands by.

In S706, the control unit 11 determines whether or not the operation value of the output operator 60 has increased. In a case where the operation value has increased, the process proceeds to S707. On the other hand, in a case where it has not increased, the process stands by.

In S707, the control unit 11 controls the irradiation range (irradiation distance) of the lamp body 40 according to the detected operation value, and controls the irradiation range (irradiation width) of the lamp body 40 based on the change in the traveling direction. The control of the irradiation range (irradiation distance) according to the detected operation value can be the control described in the first embodiment or the second embodiment. In the present embodiment, control of the irradiation range (irradiation width) mainly based on a change in the traveling direction (decrease in inclination of the vehicle 100) will be described with reference to FIG. 8C.

Figure 8C:
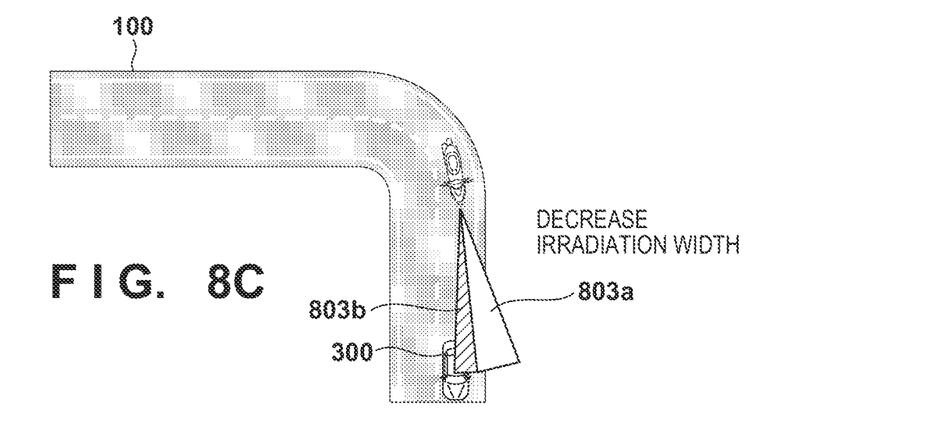
FIG. 8C is a diagram illustrating an example of an irradiation width and an irradiation distance at the end of curve traveling according to the third embodiment.

FIG. 8C illustrates a state immediately before the vehicle 100 according to the present embodiment finishes turning the curve after a further lapse of time from the state of FIG. 8B. Since it is immediately before the end of the curve, the inclination of the vehicle 100 is reduced, and the vehicle is returning to the horizontal direction. Moreover, since the vehicle is decelerating at the curve, the operation value of the output operator 60 is increased by the operation of the driver for acceleration. The irradiation range (irradiation distance) of the lamp body 40 at this time is an irradiation distance 803 longer than the irradiation distance 802 according to the increased operation value.

As for the irradiation distance 803, in addition to a normal irradiation range 803a, an irradiation range 803b is enlarged in the right direction which is the side of the traveling direction. However, the enlargement width is narrower than that in FIG. 8B. In this manner, control is performed to widen the irradiation width by the irradiation range 803a and the irradiation range 803b. As described above, since the road and the preceding vehicle 300 are present in the irradiation direction at the time of fully turning the curve, it is gradually unnecessary to increase the irradiation width. Therefore, control is performed to reduce the irradiation width as compared with FIG. 8B.

Note that, although not illustrated, in a case where the vehicle completes the curve and the inclination of the vehicle 100 is almost eliminated and the movement shifts to the linear movement again, control is performed such that the irradiation width is not enlarged as illustrated in FIG. 8A.

As described above, in the present embodiment, the control of changing the irradiation width is performed according to the change in the traveling direction. Specifically, in a case where the traveling direction changes due to a curve, a right or left turn at an intersection, or the like, the irradiation width is enlarged toward the side of the traveling direction, and the irradiation width is reduced and returned to the original position at the time of completion of the curve travel, the right or left turn at the intersection, or the like.

As a result, the irradiation width can be appropriately enlarged or reduced at the time of traveling on a curve, turning right or left at an intersection, or the like, and the visibility in front can be improved.

Modifications

In the present embodiment, an example has been described in which the irradiation distance is controlled according to the operation value of the output operator 60, and the control of changing the irradiation width is further performed according to the change in the traveling direction, but only the control of changing the irradiation width may be performed according to the change in the traveling direction.

Furthermore, in the present embodiment, an example has been described in which after the control to increase the irradiation width is performed in S704, the traveling direction is changed again to reduce the inclination of the vehicle 100 (S705), and the control to decrease the irradiation width is performed on the basis of the increase in the operation value of the output operator 60 (S706), but the present invention is not limited thereto. For example, the control may be performed based on an increase in the operation value of the output operator 60 regardless of a change in the traveling direction when the irradiation width once enlarged by a curve or turning right or left is narrowed (returned to the original state). The reason why the operation value of the output operator 60 is increased again is that it is considered that the curve or the right/left turn is completed.

Furthermore, the irradiation width may be continuously changed or discretely changed according to the degree of change in the traveling direction (inclination of the vehicle 100). In the case of continuous change, control is performed such that the larger the inclination of the vehicle 100, the larger the irradiation width. At this time, since some inclination occurs even in the upright state, a continuous change may be performed in a case where a predetermined or more inclination occurs. In a case where the irradiation width is discretely controlled, for example, in a case where the inclination of vehicle 100 becomes greater than or equal to the first threshold, the irradiation width is enlarged to become a first irradiation width, and in a case where the inclination becomes greater than or equal to a second threshold larger than the first threshold, the irradiation width is enlarged to become a second irradiation width larger than the first irradiation width.

Furthermore, in the present embodiment, the example in which the angular velocity sensor 22 is used for detecting the change in the traveling direction has been described, but the present invention is not limited thereto. For example, in response to the driver driving the direction indicator 50, the irradiation width may be increased to the side of the traveling direction. For example, the irradiation width may be expanded to a side of the right direction in response to blinking a blinker for turning right by driving the direction indicator 50. Then, in a case where the direction indicator 50 is stopped (in a case where the actuation of the blinker is stopped), it may be determined that the right or left turn is completed, and the enlarged irradiation range may be controlled to be returned to the original state. Alternatively, in a case where the direction indicator 50 is stopped and the operation value of the output operator 60 increases (in a case where the driver performs the acceleration operation), the control may be performed so as to return the enlarged irradiation range to the original range.

Furthermore, instead of the angular velocity sensor 22 and the direction indicator 50, for example, the inclination of the vehicle 100 may be calculated from information acquired by an external information acquisition device such as the camera 23, and a change in the traveling direction may be detected. Furthermore, the irradiation range may be controlled according to light emitted from an oncoming vehicle or a preceding vehicle traveling in the same lane as the self-vehicle acquired by the external information acquisition device or a distance to the self-vehicle.

Furthermore, in each of the above-described embodiments, an example has been described in which the irradiation distance is controlled by associating the change in speed with the change in the operation value of the output operator 60, but the present invention is not limited thereto. For example, the irradiation distance may be controlled using the values of the acceleration sensor 26 and the wheel speed sensor 27.

Summary of Embodiments

The vehicle (100, for example) according to the first aspect is a vehicle including a lamp body (40, for example) that irradiates surroundings of the vehicle, comprising
a control unit (11, for example) configured to control an irradiation range of the lamp body according to a speed of the vehicle,
wherein the control unit controls the irradiation range according to the speed to be different when the speed increases and when the speed decreases.

This makes it possible to control the irradiation range of the lamp body to a more appropriate range according to the speed of the vehicle.

In the vehicle (100, for example) according to the second aspect, the control unit
controls to widen the irradiation range when the speed increases, and
controls to narrow the irradiation range when the speed decreases.

As a result, a wider range can be irradiated at the time of acceleration, and thus visibility can be improved. On the other hand, an appropriate range can be irradiated at the time of deceleration, and thus the irradiation range of the lamp body can be controlled to a more appropriate range according to the speed of the vehicle.

In the vehicle (100, for example) according to the third aspect,
the control unit widens the irradiation range according to the speed in a case where the speed becomes greater than or equal to a first threshold (for example, 50 km/h or a throttle opening degree of 50%) at the time of increasing the speed.

In this manner, by providing a threshold for the speed at which the irradiation range is changed, making the irradiation range of the lamp body not unnecessarily change during low-speed operation such as traffic congestion, and changing the irradiation range of the lamp body in a case where the driver increases the speed in order to increase the vehicle speed, it is possible to realize more appropriate control of the irradiation range according to the traveling state.

In the vehicle (100, for example) according to the fourth aspect, the control unit controls a change rate of the irradiation range to be different when the speed increases and when the speed decreases (BC and CF in FIG. 5, for example).

This makes it possible to control the irradiation range of the lamp body to a more appropriate range according to the speed of the vehicle.

In the vehicle (100, for example) according to the fifth aspect, the control unit controls the irradiation range corresponding to an arbitrary speed to be wider when the speed decreases than when the speed increases.

As a result, it is possible to prevent the irradiation range from being unnecessarily narrowed when the speed decreases.

In the vehicle (100, for example) according to the sixth aspect, the control unit controls the irradiation range of the lamp body based on a time change rate of the speed.

In this way, by changing the irradiation range according to the change rate of the speed, it is possible to realize more appropriate control of the irradiation range according to the traveling state. For example, the control of the irradiation range can be made different between the case where the speed is rapidly changed and the case where the speed is not rapidly changed.

In the vehicle (100, for example) according to the seventh aspect, the control unit controls to, when the speed decreases, makes wider the irradiation range corresponding to an arbitrary speed as a time change rate of the speed is larger.

As described above, by widening the irradiation range with respect to the speed in a case where the change rate of the speed is large (for example, in a case where the throttle is rapidly closed), it is possible to suppress the irradiation range from being suddenly narrowed and a visual recognition area of the driver from being suddenly narrowed. Therefore, more appropriate control of the irradiation range according to the traveling state can be realized.

In the vehicle (100, for example) according to the eighth aspect, the control unit controls an irradiation distance as the irradiation range.

This makes it possible to control the irradiation distance to be appropriate according to the situation.

The vehicle (100, for example) according to the ninth aspect further comprises a detection unit (11, 22, 50, for example) configured to detect a change in a traveling direction of the vehicle,
wherein in a case where the change in the traveling direction is detected and a decrease in the speed is detected, the control unit widens an irradiation width to a side of the traveling direction.

In this manner, it is possible to improve the visibility of a road surface on a changing side in the traveling direction and the visibility of a front side at the time of passing through a curve or turning right or left at the intersection, and thus, it is possible to realize more appropriate control of the irradiation range according to the traveling state.

In the vehicle (100, for example) according to the tenth aspect, the control unit narrows the irradiation width in a case where an increase in the speed is detected after widening the irradiation width to the side of the traveling direction.

In this manner, by narrowing the irradiation width in response to the completion of the curve passage or the right/left turn at the intersection and the start of acceleration, it is possible to suppress an oncoming vehicle from being irradiated with light.

In the vehicle (100, for example) according to the eleventh aspect, the detection unit detects the change in the traveling direction based on a value of an angular velocity sensor (22, for example) that detects an inclination of the vehicle.

As a result, a change in the traveling direction can be detected from the inclination of the vehicle, and the degree of change in the traveling direction can be grasped in detail by the degree of inclination.

The vehicle (100, for example) according to the twelfth aspect further comprises a direction indicator (50, for example) that notifies surroundings of the change in the traveling direction of the vehicle,
wherein the detection unit detects the change in the traveling direction based on driving of the direction indicator.

As a result, it is possible to detect a change in the traveling direction by using the component normally provided in the vehicle, and thus, it is possible to reduce the cost.

In the vehicle (100, for example) according to the thirteenth aspect, the vehicle further comprises a drive unit (30, for example) being a drive power source;
an output operator (60, for example) changing an output of the drive unit according to an operation of a driver of the vehicle; and
a sensor (21, for example) detecting an operation value of the output operator,
wherein the control unit controls the irradiation range of the lamp body according to the operation value, using the operation value as the speed of the vehicle.

This makes it possible to control the irradiation range of the lamp body to a more appropriate range according to the operation of the driver.

In the vehicle (100, for example) according to the fourteenth aspect, the vehicle is a straddle type vehicle.

As a result, in the straddled vehicle, the irradiation range of the lamp body can be controlled to a more appropriate range according to the speed of the vehicle.

The control method for a vehicle (100, for example) according to the fifteenth aspect is a control method for a vehicle including a lamp body (40, for example) that irradiates surroundings of the vehicle, the control method comprising controlling (S302, for example) an irradiation range of the lamp body according to a speed of the vehicle,
wherein, in the controlling, the irradiation range according to the speed is controlled to be different when the speed increases and when the speed decreases (FIG. 4~FIG. 6, for example).

This makes it possible to control the irradiation range of the lamp body to a more appropriate range according to the speed of the vehicle.

The program according to the sixteenth aspect is a program for causing a computer to execute the step of the control method for a vehicle according to the fifteenth aspect.

As a result, the processing of the vehicle can be realized by the computer.

The invention is not limited to the foregoing embodiments, and various variations/changes are possible within the spirit of the invention.

The invention claimed is:

1. A vehicle including a lamp body that irradiates surroundings of the vehicle, comprising:
a control unit configured to control an irradiation range of the lamp body according to a speed of the vehicle,
wherein the control unit controls the irradiation range according to the speed to be different when the speed increases and when the speed decreases,
wherein the control unit controls a change rate of the irradiation range to be different when the speed increases and when the speed decreases,
wherein the control unit controls the change rate of the irradiation range, such that i) at the time of increasing the speed of the vehicle, the irradiation range is expanded according to the increase of the speed of the vehicle and at the time of decreasing the speed of the vehicle, the irradiation range is decreased according to the decrease of the speed of the vehicle, and ii) a decreasing speed of decreasing the irradiation range is controlled to be slower than an expanding speed of expanding the irradiation range according to the increase of the speed of the vehicle at the time of increasing the speed of the vehicle.

2. The vehicle according to claim 1, further comprising:
a detection unit configured to detect a change in a traveling direction of the vehicle,
wherein in a case where the change in the traveling direction is detected and a decrease in the speed is detected, the control unit widens an irradiation width to a side of the traveling direction.

3. The vehicle according to claim 2, wherein the control unit narrows the irradiation width in a case where an increase in the speed is detected after widening the irradiation width to the side of the traveling direction.

4. The vehicle according to claim 2, wherein the detection unit detects the change in the traveling direction based on a value of an angular velocity sensor that detects an inclination of the vehicle.

5. The vehicle according to claim 2, further comprising:
a direction indicator that notifies i) surroundings of the vehicle ii) of the change in the traveling direction of the vehicle,
wherein the detection unit detects the change in the traveling direction based on driving of the direction indicator.

6. The vehicle according to claim 1, wherein
the control unit
controls to widen the irradiation range when the speed increases, and
controls to narrow the irradiation range when the speed decreases.

7. The vehicle according to claim 6, wherein the control unit widens the irradiation range according to the speed in a case where the speed becomes greater than or equal to a first threshold when the speed increases.

8. The vehicle according to claim 1, wherein the control unit controls the irradiation range of the lamp body based on a time change rate of the speed.

9. The vehicle according to claim 8, wherein the control unit controls to, when the speed decreases, make larger the irradiation range corresponding to a specific speed as the time change rate of the speed is larger.

10. The vehicle according to claim 1, wherein the control unit controls the irradiation range corresponding to a specific speed to be larger when the speed decreases than when the speed increases.

11. The vehicle according to claim 1, wherein the control unit controls an irradiation distance as the irradiation range.

12. The vehicle according to claim 1, further comprising:
a drive unit as a drive power source of the vehicle;
an output operator changing an output of the drive unit according to an operation of a driver of the vehicle; and
a sensor detecting an operation value of the output operator,
wherein the control unit controls the irradiation range of the lamp body according to the operation value, using the operation value as the speed of the vehicle.

13. The vehicle according to claim 1, wherein the vehicle is a straddle type vehicle.

14. A vehicle including a lamp body that irradiates surroundings of the vehicle, comprising:
a control unit configured to control an irradiation range of the lamp body according to a speed of the vehicle,
wherein the control unit controls the irradiation range according to the speed to be different when the speed increases and when the speed decreases,
wherein the control unit controls the lamp body to expand the irradiation range of the lamp body in response to an increase in the speed and to narrow the irradiation range of the lamp body in response to a decrease in the speed,
wherein the control unit controls a change rate of the irradiation range to be different when the speed increases and when the speed decreases, and
the change rate of the irradiation range is greater at the time of increasing the speed of the vehicle than at the time of decreasing the speed of the vehicle.

15. The vehicle according to claim 14, wherein
the irradiation range is kept constant until the speed exceeds a predetermined threshold, and
the irradiation range of the lamp is changed according to the speed after the speed exceeds the predetermined threshold.

16. The vehicle according to claim 14, wherein
the speed is detected based on an amount of operation of an output operator changing an output of a drive unit that is a driving force source according to an operation of a driver.

17. A control method for a vehicle including a lamp body that irradiates surroundings of the vehicle, the control method comprising:
controlling an irradiation range of the lamp body according to a speed of the vehicle,
wherein, in the controlling, the irradiation range according to the speed is controlled to be different when the speed increases and when the speed decreases,
wherein in the controlling, a change rate of the irradiation range is controlled to be different when the speed increases and when the speed decreases,
wherein the change rate of the irradiation range is controlled, such that i) at the time of increasing the speed of the vehicle, the irradiation range is expanded according to the increase of the speed of the vehicle and at the time of decreasing the speed of the vehicle, the irradiation range is decreased according to the decrease of the speed of the vehicle, and ii) a decreasing speed of decreasing the irradiation range is controlled to be slower than an expanding speed of expanding the irradiation range according to the increase of the speed of the vehicle at the time of increasing the speed of the vehicle.

18. A non-transitory storage medium storing a program for causing a computer to execute a control method for a vehicle including a lamp body that irradiates surroundings of the vehicle, the control method comprising:
controlling an irradiation range of the lamp body according to a speed of the vehicle,
wherein, in the controlling, the irradiation range according to the speed is controlled to be different when the speed increases and when the speed decreases,
wherein in the controlling, a change rate of the irradiation range is controlled to be different when the speed increases and when the speed decreases,
wherein the change rate of the irradiation range is controlled, such that i) at the time of increasing the speed of the vehicle, the irradiation range is expanded according to the increase of the speed of the vehicle and at the time of decreasing the speed of the vehicle, the irradiation range is decreased according to the decrease of the speed of the vehicle, and ii) a decreasing speed of decreasing the irradiation range is controlled to be slower than an expanding speed of expanding the irradiation range according to the increase of the speed of the vehicle at the time of increasing the speed of the vehicle.

* * * * *